United States Patent Office 3,378,546
Patented Apr. 16, 1968

3,378,546
HYDROXYPROPYL STARCH ETHER
Toshio Tsuzuki, Oak Lawn, Ill., assignor to American Maize Products Company, a corporation of Maine
No Drawing. Filed Mar. 3, 1965, Ser. No. 436,927
7 Claims. (Cl. 260—233.3)

ABSTRACT OF THE DISCLOSURE

An aqueous mixture of starch granules, alkali catalyst and propylene oxide is held for at least ¼ hour at a temperature up to about 94° F., prior to reacting the starch and propylene oxide at higher temperatures. The holding step enhances the reaction efficiency to produce granular hydroxypropyl starch ether having an increased quantity of hydroxypropyl substituents.

This invention relates to a method of reacting starch with propylene oxide to form hydroxypropyl starch ether in granular form. It is known that chemical derivatives of starch, such as ethers, esters, amides, etc., frequently possess properties which are more useful or desirable than those of the parent material itself. In this respect, the hydroxypropyl ether of starch is, for example, capable of pasting at a much lower temperature than that of raw starch. Hydroxypropyl starch has other unique properties, also, which make it a more desirable or preferred material than unmodified starch in many applications.

Heretofore, various methods have been suggested for preparation of hydroxypropyl starch ether, some involving a dry reaction between starch and propylene oxide, some requiring a pressure-tight vessel, some a wet reaction where either a non-aqueous solvent is used or starch granules are eventually gelatinized, and a few methods involving a reaction of starch with propylene oxide in aqueous slurry with alkaline catalyst under normal pressure. However, all of these methods have presented drawbacks of one form or another which have made it very difficult to obtain high reaction efficiencies and controllable results in commercial preparation of hydroxypropyl starch ether in granular form.

A new method of carrying out reaction between starch and propylene oxide has now been discovered based on the finding that a holding period at controlled temperature has a remarkably favorable effect upon the subsequent progress and outcome of the reaction. More specifically, it has been found that if starch, in aqueous slurry, is maintained mixed with propylene oxide for at least about ¼ hour at a temperature up to but not greater than about 94° F., then subsequent reaction at elevated temperatures will yield hydroxypropyl starch ethers of a greater degree of substitution (D.S. on a controllable consistent basis. Thus, less propylene oxide can be used in the process of this invention to achieve the same D.S. as obtained with greater amounts of oxide reacted with starch conventionally, or the same amount of propylene oxide as used in a conventional reaction will yield a product of higher D.S. in the process of invention. Moreover, the invention provides a process which can be readily controlled and relied upon for products of substantially uniform quality without the erratic results that have been heretofore experienced with conventional processes.

In carrying out the process of the invention, starch granules are first slurried or dispersed in water and the aqueous slurry is then catalyzed by addition of alkali such as an alkali metal or alkaline earth metal hydroxide or carbonate. The alkali may be added in amounts ranging from about 0.02 to about 0.4 mole per mole of starch (162 g. per mole). Preferably a gelatinization inhibitor such as sodium sulfate or sodium chloride is also added to the slurry to increase the amount of alkali which may be absorbed by the starch granules without their swelling at the elevated temperatures which are required for the reaction with propylene oxide. The amount of the gelatinization inhibitor may be from about 0.05 to about 1.0 mole per mole of starch, and the weight of all solids including starch, alkali catalyst and gelatinization inhibitor, if any, should be from about 30% about 50% based on the total weight of the slurry.

Following preparation of the alkaline catalyzed aqueous starch slurry as described above, propylene oxide is added to the slurry, which is held at a temperature below 94° F. The amount of propylene oxide should be from about 1.0% to about 25% based on the dry weight of starch, depending on the degree of derivatization desired. Preferably, the propylene oxide is added below the slurry surface with agitation so that an intimate mixture may be rapidly formed.

In accordance with the invention, the aqueous mixture of starch and propylene oxide is now maintained over a holding period of at least ¼ hour at a temperature up to but not greater than 94° F. The holding period may be continued for one half hour or more but as a practical matter there is no point to prolonging the holding period as no significant advantages are thereby derived. Preferably, the slurry temperature at the time the propylene oxide is being added and during the holding period is from about 60 to 80° F., although lower temperatures may be employed.

As previously mentioned, the holding period in some manner favorably preconditions the starch granules so that a greater efficiency and uniformity of reaction is achieved subsequently with the propylene oxide. Apparently the holding period during which the starch granules are in effect steeped in aqueous propylene oxide increases the penetrability of the starch granules by the propylene oxide although it is not at all certain whether this is both a chemical and physical penetration or only chemical.

In any event, following the holding period, the temperature of the starch slurry and the propylene oxide therein is elevated to at least 120° F. and if desired up to about 140° F. At these temperatures, reaction will proceed between the starch granules and the propylene oxide whereby hydroxypropyl ether substituents will be attached to the starch molecule. The reaction may be completed in the space of about 1 to 3 hours although the reaction may last for up to 24 hours. Following completion of the reaction, the reaction mixture is cooled, neutralized by addition of an acid, and the starch product is washed prior to drying. The dry product is in granular form.

The product of the reaction is a cold water dispersible hydroxypropyl starch ether which has many desirable properties for use in coating, sizing and film applications.

The process of the invention is applicable to a variety of starches. For example, any form of raw starch such as corn, grain sorghum, tapicoa, potato and waxy maize starches may be employed, as well as modified starches. The process of the invention may also be used in connection with pure amylose as a reactant or with high amylose strains of natural starch containing 50% or more amylose. In particular, the hydroxypropyl derivatives of such high amylose varieties of raw starch with suitable plasticizers are extremely useful in the manufacture of commercial packaging films by extrusion. For example, a composition of 50 to 80% by weight of hydroxypropyl ether of high amylose starch 20 to 50% by weight of water, with or without up to 30% by weight of a compatible plasticizer having at least one alcoholic hydroxy group, can be converted to a homogenous plastic mass at elevated temperatures under pressure and then cooled and extruded into a self-supporting film having excellent characteristics for packaging and other applications.

As used herein, the term "starch" is intended to cover any one or all of the foregoing mentioned raw materials which may be hydroxypropylated in accordance with the process of the invention.

The following example in the opinion of the inventor represent the best embodiments of the invention now known to him.

EXAMPLE I

An aqueous slurry containing 500 g. (with 10% moisture) of ordinary cornstarch, 800 ml. of water, 5 g. of sodium hydroxide and 70 g. of sodium sulfate was prepared and held at a temperature of 65° F. While the slurry was being stirred, 50 ml. of propylene oxide was introduced to the slurry and mixed for approximately ½ hour. Thereafter, the temperature of the mixture was increased to 120° F. and maintained at that level for 8 hours before the slurry was neutralized with hydrochloric acid to pH 5.5. Thereafter, the product hydroxypropyl starch ether, which was still in the granular state, was filtered, washed thoroughly and dried. The D.S. of this product was 0.050. Another batch of ordinary cornstarch was reacted with propylene oxide in the manner described above, except that the slurry was heated to 120° F. prior to the addition of propylene oxide, without use of ½ hour holding period at 65° F. The resulting product had a D.S. of 0.035.

EXAMPLE II

An aqueous slurry containing 500 g. (with 10% moisture) of ordinary common starch, 800 ml. of water, 5 g. of sodium hydroxide and 58 g. of sodium chloride was prepared and held at 70° F. To this slurry 50 ml. of propylene oxide was added and mixed for approximately 15 minutes. Thereafter the temperature of the mixture was raised to 120° F. and maintained at the level for 8 hours before the slurry was neutralized to pH 5.5. Then the resulting hydroxypropyl starch ether in the granular state was filtered, washed thoroughly and dried. The D.S. of this product was 0.047.

Another batch of ordinary cornstarch was reacted with propylene oxide in the manner described above, except that the slurry was heated to 120° F. prior to the addition of propylene oxide whereby the holding period at 70° F. was omitted. The product had a D.S. of 0.030.

EXAMPLE III

An aqueous slurry containing 500 g. (without 10.5% moisture) of high amylose cornstarch (amylose content of about 70%), 800 ml. of water, 15 g. of sodium sulfate and 114 g. of sodium sulfate was prepared and held at 70° F. with agitation. Then 50 ml. of propylene oxide was added to the slurry and the mixture was heated to 120° F. After 18 hours at 120° F. the reaction mixture was neutralized to pH 5.5, filtered, washed thoroughly and dried. The product had a D.S. of 0.040.

It will be understood that it is intended to cover all changes and modifications of the preferred embodiments of the invention, herein chosen for the purpose of illustration, which do not depart from the spirit and scope of the invention.

What is claimed is:

1. In the preparation of a granular hydroxypropyl starch ether by reacting propylene oxide at elevated temperatures with an aqueous mixture of starch granules and an alkali catalyst, the improved process comprising adding to said mixture from about 1.0% to 25% of propylene oxide based on the dry weight of starch, and then holding said mixture for at least ¼ hour at a temperature up to about 94° F. prior to reacting said starch with said propylene oxide, said holding tep being effective to increase the quantity of hydroxypropyl substituents in the final product.

2. Process as in claim 1 wherein the amount of alkali catalyst is from about 0.02 to about 0.4 mole per mole of starch.

3. Process as in claim 1 which includes the step of adding from about 0.05 to about 1.0 mole of gelatinization inhibitor per mole of starch to said mixture of starch, alkali catalyst and water prior to addition of said propylene oxide.

4. Process as in claim 1 wherein said mixture is held from about ¼ to about ½ hour.

5. Process as in claim 1 wherein said reaction is carried out at about 120° F. to about 140° F.

6. Process as in claim 1 wherein the weight of starch and alkali catalyst is from about 30% to about 50% based on total weight of said mixture.

7. A process of preparing hydroxypropyl starch ether which comprises forming an aqueous slurry containing starch granules, from about 0.02 to about 0.4 mole of alkali catalyst per mole of starch and from about 0.05 to about 1.0 mole of gelatinization inhibitor per mole of starch, the combined weight of said starch, alkali catalyst and gelatinization inhibitor being from about 30 to about 50% based on total weight of said slurry, adding with agitation from about 1.0% to about 25% of propylene oxide based on the dry weight of starch in said slurry, holding said slurry for at least about ¼ hour at a temperature up to 94° F., then increasing the temperature of said slurry to from about 120° F. to about 140° F. and maintaining said elevated temperature to effect reaction between said starch and propylene oxide, then neutralizing the resulting reaction mixture and recovering the resulting hydroxypropyl starch ether in granular form, said holding step being effective to increase the quantity of hydroxypropyl substituents in the final product.

References Cited

UNITED STATES PATENTS 2,516,634   7/1950   Kesler et al. _____ 260—233.3

DONALD E. CZAJA, *Primary Examiner.*

R. W. MULCAHY, *Assistant Examiner.*